US009558638B2

(12) United States Patent
Graphenius

(10) Patent No.: US 9,558,638 B2
(45) Date of Patent: Jan. 31, 2017

(54) SECURITY ARRANGEMENT AND METHOD THERFOR

(71) Applicant: Jonas Patrik Graphenius, Solna (SE)

(72) Inventor: Jonas Patrik Graphenius, Solna (SE)

( * ) Notice: Subject to any disclaimer, the term of this patent is extended or adjusted under 35 U.S.C. 154(b) by 2 days.

(21) Appl. No.: 14/033,209

(22) Filed: Sep. 20, 2013

(65) Prior Publication Data

US 2014/0085088 A1 Mar. 27, 2014

(30) Foreign Application Priority Data

Sep. 25, 2012 (SE) ....................................... 1251080

(51) Int. Cl.

| | |
|---|---|
| ***G08B 13/196*** | (2006.01) |
| ***G08B 21/04*** | (2006.01) |
| ***G01P 15/08*** | (2006.01) |
| ***G08B 13/00*** | (2006.01) |
| *G08B 13/08* | (2006.01) |

(52) U.S. Cl.

CPC ......... *G08B 13/00* (2013.01); *G08B 13/19695* (2013.01); *G08B 21/0415* (2013.01); *G08B 13/08* (2013.01)

(58) Field of Classification Search

CPC ....... B60R 25/10; G06K 7/10366; G08B 5/22; H04B 1/709; H04L 12/5895; H04L 63/105; H04L 63/107; H04L 67/18; H04L 67/22; H04N 7/18; H04W 4/025; H04W 4/22; H04W 64/00

USPC ....... 340/541, 506, 540, 3.1, 3.32, 500, 521, 340/533, 539.1, 539.11, 545.1, 937, 988; 348/143, E7.086, E7.089, 159, E7.087, 348/152, 153, E5.042, E7.031, E7.09, 348/148, 154, 155, 156, 169, 211.9, 699

See application file for complete search history.

(56) References Cited

U.S. PATENT DOCUMENTS

| | | | | | |
|---|---|---|---|---|---|
| 3,575,552 | A | * | 4/1971 | Grant et al. | 386/223 |
| 4,150,369 | A | * | 4/1979 | Gaspari et al. | 340/516 |
| 4,578,665 | A | * | 3/1986 | Yang | 246/166.1 |
| 4,833,449 | A | * | 5/1989 | Gaffigan | 340/505 |
| 5,001,557 | A | * | 3/1991 | Begle | 348/166 |
| 5,706,388 | A | * | 1/1998 | Isaka | 386/206 |
| 5,926,209 | A | * | 7/1999 | Glatt | 348/143 |
| 6,049,353 | A | * | 4/2000 | Gray | 348/159 |

(Continued)

FOREIGN PATENT DOCUMENTS

| | | | |
|---|---|---|---|
| EP | 1585077 | A2 | 10/2005 |
| EP | 2068290 | A1 | 6/2009 |
| WO | WO-2008006320 | A1 | 1/2008 |

OTHER PUBLICATIONS

International Preliminary Report on Patentability, International Patent Application No. PCT/SE2013/051089, mailed Sep. 15, 2014. 12 pages.

(Continued)

*Primary Examiner* — Fekadeselassie Girma

(74) *Attorney, Agent, or Firm* — Perkins Coie LLP

(57) ABSTRACT

The present invention relates to a security arrangement (1) comprising: a housing (2); a sensor arrangement (3) arranged in said housing; a camera device (4) arranged in said housing; and a communication unit (5) arranged in said housing; wherein said sensor arrangement is configured to detect movement of a door (6) being monitored by said security arrangement and said security arrangement is configured to in response to detection of movement of said door activate said camera device and take a picture, and wherein said security arrangement is configured to transmit a taken picture to a contact list utilizing said communication unit.

8 Claims, 1 Drawing Sheet

(56) References Cited

U.S. PATENT DOCUMENTS

| | | | | |
|---|---|---|---|---|
| 6,069,655 | A * | 5/2000 | Seeley et al. | 348/154 |
| 6,154,130 | A | 11/2000 | Mondejar et al. | |
| 6,392,692 | B1 * | 5/2002 | Monroe | 348/143 |
| 6,545,601 | B1 * | 4/2003 | Monroe | 340/521 |
| 6,829,430 | B1 * | 12/2004 | Ashizaki et al. | 386/227 |
| 7,244,231 | B2 * | 7/2007 | Dewing | A61B 5/0002 128/920 |
| 7,539,520 | B2 * | 5/2009 | Twitchell, Jr. | H04W 76/04 370/318 |
| 7,653,394 | B2 * | 1/2010 | McMillin | H04L 45/00 370/331 |
| 8,350,694 | B1 * | 1/2013 | Trundle et al. | 340/539.11 |
| 2001/0010493 | A1 | 8/2001 | Script et al. | |
| 2001/0030689 | A1 * | 10/2001 | Spinelli | 348/155 |
| 2002/0135677 | A1 * | 9/2002 | Noro et al. | 348/143 |
| 2003/0098908 | A1 * | 5/2003 | Misaiji et al. | 348/148 |
| 2004/0080410 | A1 * | 4/2004 | Pan et al. | 340/539.1 |
| 2004/0227629 | A1 | 11/2004 | Adamczyk et al. | |
| 2004/0263624 | A1 * | 12/2004 | Nejikovsky et al. | 348/148 |
| 2005/0073575 | A1 * | 4/2005 | Thacher et al. | 348/14.13 |
| 2005/0141465 | A1 * | 6/2005 | Kato et al. | 370/337 |
| 2005/0237207 | A1 | 10/2005 | Gilbert | |
| 2006/0017809 | A1 * | 1/2006 | Carroll | 348/158 |
| 2006/0116837 | A1 * | 6/2006 | Hager et al. | 702/95 |
| 2006/0161960 | A1 * | 7/2006 | Benoit | 725/105 |
| 2007/0076095 | A1 | 4/2007 | Tomaszewski | |
| 2007/0171046 | A1 * | 7/2007 | Diem | G06Q 10/00 340/539.13 |
| 2007/0285222 | A1 * | 12/2007 | Zadnikar | 340/509 |
| 2008/0042809 | A1 | 2/2008 | Watts et al. | |
| 2008/0100705 | A1 * | 5/2008 | Kister et al. | 348/143 |
| 2008/0129498 | A1 * | 6/2008 | Howarter et al. | 340/541 |
| 2008/0129821 | A1 * | 6/2008 | Howarter et al. | 348/143 |
| 2008/0169922 | A1 | 7/2008 | Issokson | |
| 2008/0180525 | A1 * | 7/2008 | Kanehira et al. | 348/143 |
| 2009/0056640 | A1 * | 3/2009 | Gross | 119/702 |
| 2009/0086025 | A1 | 4/2009 | Ngu et al. | |
| 2009/0154769 | A1 * | 6/2009 | Yoon et al. | 382/103 |
| 2009/0182817 | A1 * | 7/2009 | Lim | G06F 17/30194 709/206 |
| 2009/0243878 | A1 | 10/2009 | Ricordi et al. | |
| 2009/0309723 | A1 | 12/2009 | Freebody et al. | |
| 2009/0309765 | A1 * | 12/2009 | Wang et al. | 341/20 |
| 2010/0019902 | A1 | 1/2010 | Mullet | |
| 2011/0149078 | A1 | 6/2011 | Fan et al. | |
| 2011/0154411 | A1 * | 6/2011 | Feher | H04W 64/00 725/62 |
| 2011/0227712 | A1 * | 9/2011 | Atteck | B60R 25/10 340/429 |
| 2011/0292201 | A1 * | 12/2011 | Westphal et al. | 348/81 |
| 2012/0218421 | A1 * | 8/2012 | Chien | 348/207.1 |
| 2012/0319840 | A1 | 12/2012 | Amis | |
| 2013/0263240 | A1 * | 10/2013 | Moskovitch | 726/7 |
| 2013/0288743 | A1 * | 10/2013 | Hunt et al. | 455/556.1 |
| 2014/0022372 | A1 * | 1/2014 | Martensson et al. | 348/78 |

OTHER PUBLICATIONS

Extended European Search Report for European Patent Application No. 13841648.2, issued by European Patent Office on Jul. 8, 2016. 9 pages.

Chinese Office Action with English translation for Chinese Application No. 201380047887.3, Security Arrangement and Method Therefor, issued by State Intellectual Property Office of People's Republic of China on Aug. 1, 2016. 18 pages.

* cited by examiner

SECURITY ARRANGEMENT AND METHOD THERFOR

TECHNICAL FIELD

The present invention relates to a security arrangement.

BACKGROUND

Many people are today worried about there security when they are home, particularly those who are week, old, disabled or hurt, and who live in a home, a boat, in a trailer or in other places.

A solution to increase security in a neighborhood today is e.g. neighborhood watch, emptying a neighborhood mail box, leaving a car at land area, etc., but not everybody have neighbors they can rely on.

SUMMARY

Many people, particularly old people, have relatives or friends who would feel better if they know that their relatives or friends are all right. Particularly old people many times have difficulties in handling electronic equipment like phones or computers, and the inventor has realized that a simplified means for keeping in touch with each other is desirable.

One object of the present invention is to alleviate for a person to keep relatives and/or friends up to date with his/her safety status.

This object is according to the present invention attained by a security arrangement, and a method therefor, respectively, as defined by the appended claims.

By providing a security arrangement comprising: a housing; a sensor arrangement arranged in the housing; a camera device arranged in the housing; and a communication unit arranged in the housing; wherein the sensor arrangement is configured to detect movement of a device being monitored by the security arrangement and the security arrangement is configured to in response to detection of movement of the device activate the camera device and take a picture, and wherein the security arrangement is configured to transmit a taken picture to a contact list utilizing the communication unit, a person can easily and automatically keep e.g. relatives and/or friends up to date of his/her safety status.

The sensor arrangement is preferably also configured to monitor motion in an area at the security arrangement, and the security arrangement is then also configured to transmit a notification to the contact list utilizing the communication unit when no motion in the area has been detected during a predetermined period of time, wherein a passive safety status update also is provided.

The security arrangement is advantageously a mobile unit, which is attached to the device being monitored during use, which device preferably is a door, whereby one security arrangement easily can be moved between different places, such as between a home, a boat, a trailer, a nursing home, a car.

For a further security measurement, the sensor arrangement preferably also comprises a microphone for registering sound, and the security arrangement is then configured to transmit registered sound to the contact list utilizing the communication unit.

For a yet further security measurement, the sensor arrangement preferably comprises a tampering sensor for detecting removal of the security arrangement from a device it is attached to, and the security arrangement is then configured to transmit a notification of tempering to the contact list utilizing the communication unit when indicated by the tampering sensor.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
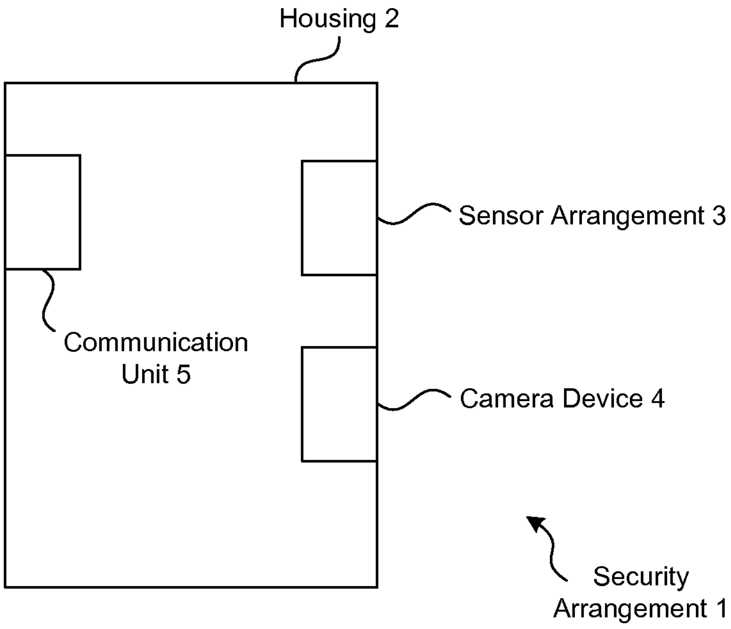
FIG. 1 schematically illustrates a security arrangement according to an embodiment of the present invention.
Figure 2:
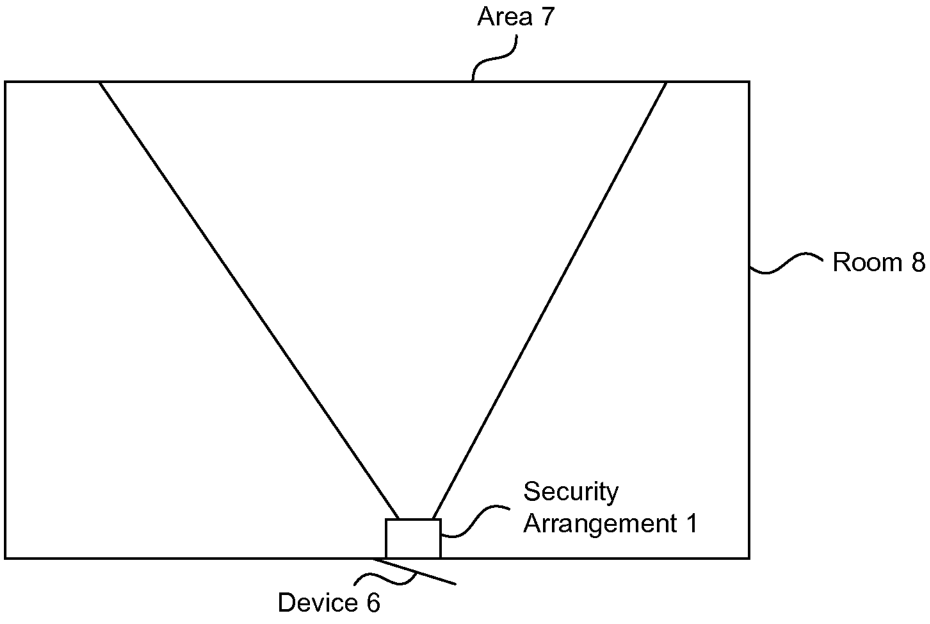
FIG. 2 schematically illustrates a security arrangement arranged in a monitoring position.

A security arrangement according to an embodiment of the present invention will now be described with reference to FIGS. 1 and 2.

The security arrangement 1 comprises: a housing 2; a sensor arrangement 3 arranged in said housing; a camera device 4 arranged in said housing; and a communication unit 5 arranged in said housing.

The sensor arrangement 3 is configured to detect movement of a device 6 being monitored by the security arrangement 1 and the security arrangement 1 is configured to, in response to detection of movement of the device 6, activate the camera device 4 and to take a picture. The security arrangement 1 is further configured to transmit a picture taken by the camera device 4 to a contact list utilizing the communication unit 5.

The contact list could e.g. be controlled/updated through a web interface, such that the security arrangement 1 need not be equipped with a direct user interface with display and/or keypad. I.e. the security arrangement 1 is thus advantageously a wireless device. Alternatively, the security arrangement 1 is in addition to, or instead of, having a web interface for control thereof equipped with a touch screen (not illustrated). Yet further, the security arrangement 1 is in addition to, or instead of, having a touch screen equipped with a key pad for easy use with dedicated buttons for e.g. contacting persons on the contact list. Yet an alternative way to manage the security arrangement 1 can be the use of an RFID tag or through a remote control.

Communication may e.g. be performed through an external unit through wifi, Bluetooth or similar technique, or through cellular communication inbuilt in the security arrangement.

The security arrangement 1 is preferably a mobile unit, which is attached to the device 6 during use, which device 6 preferably is a door. Alternatively, the security arrangement 1 is a fixed unit, but an advantage with a mobile unit is that it is easy to take with you if you visit different places, such as a boat, a trailer and the like. A fixed unit has a known position for the contact list, whereas a mobile unit may be used in many unknown positions.

A mobile unit preferably comprises positioning means, such a GPS device or a cellular triangulation device, in order for the security arrangement to be able to provide the contact list with positioning information thereof.

The picture is desired to be taken of a visitor at the door 6. This is e.g. achieved by taking a picture along the door 6, with a wide camera angle.

The sensor arrangement 3 preferably comprises a vibration detector for detection of movement of the device 6. Alternatively, the sensor arrangement 3 comprises a proximity detector, wherein the security arrangement 1 is mounted near the door frame of a door, and the proximity detector is configured to detect when the door 6 is opened by the distance between the door frame and the door being increased. Supplementary to a vibration detector, or possibly instead of a vibration detector, the sensor arrangement 3 may comprise a sensor connected to e.g. a door bell of the door, or a door lock of the door, or a door handle of the door, to detect and estimate when a visitor is at the door. The sensor arrangement 3 may comprise one or more yet further detectors, such as a smoke detector, a water warner, a temperature detector, glass breakage detector, status checks of all functions of the sensor arrangement 3, and lighting monitoring.

A suitable time between e.g. a door handle is used and a picture is take may e.g. be five seconds. Further, the camera device may be equipped with face recognition and take a picture of the visitor when a face has been detected after the sensor has detected moving door.

The sensor arrangement 3 is preferably configured to monitor motion in an area 7 at the security arrangement 1, and the security arrangement 1 is configured to transmit a notification to the contact list utilizing the communication unit 5 when no motion in the area has been detected during a predetermined period of time. The predetermined period of time is in the order of hours/days compared to minutes/seconds. A suitable period of time for monitoring non-activity of the area could e.g. be 24 hours. Although the security arrangement has been described with a camera device 4, it may further be equipped with a plurality of camera devices arranged to be pointing in different directions. In this way multiple areas may be monitored at the same time.

The sensor arrangement 3 then comprises a motion detector for detection of motion in the area 7. The motion detector may e.g. be realized by a laser sensor, monitoring a straight line, an optic sensor, monitoring a wide angle up to 180°, or an acoustic sensor, monitoring a large space such a whole room 8. Alternatively, when the door sensor comprises a door handle or door lock sensor, this sensor may also be used instead of a motion detector for detection of when no motion in the area has been detected during a predetermined period of time. In this case the area will be defined by opening/closing of the door.

The sensor arrangement 3 preferably comprises a microphone for registering sound, and the security arrangement 1 is then configured to transmit registered sound to the contact list utilizing the communication unit 5. Such a microphone may be used both for recording sound at the door 6 for registering what is said at the door 6, as well as monitoring motion in the area 7, which in this case covers the whole room 8. A further utilization of a microphone is for detection of a door bell sounding, by being programmed to identify the door bell the security arrangement 1 presently is positioned at.

The sensor arrangement 3 preferably also comprises a tampering sensor for detecting removal of the security arrangement 1 from a device 6 it is attached to, and the security arrangement 1 is then configured to transmit a notification of tempering to the contact list utilizing the communication unit 5 when indicated by the tampering sensor. By preferably having at least two independent persons on the contact list transmitting a predetermined code to the security arrangement 1 prior to removal thereof, no tampering notification will be transmitted from the security arrangement 1 when removed from an attached position.

Use of the security arrangement 1 comprises the following steps: detecting movement of a device 6 being monitored by the security arrangement; taking a picture; and transmitting a taken picture to a contact list. Preferably, use also comprises the following steps: monitoring motion in an area 7 at the security arrangement; and transmitting a notification to the contact list when no motion in the area has been detected during a predetermined period of time.

The security arrangement 1 is particularly useful for isolated people, those who have difficulties in moving around, and those who have a rather small acquaintance. The security arrangement 1 is however also useful for other places, such as public places i.e. airports.

Everybody on the contact list may be notified when a visitor is at the door, when a predetermined period of time has lapsed without a monitored person have been detected by a motion detector, when the security arrangement is tampered with, or when the monitored person manually desires to contact everybody on the contact list. A visitor will be recorded by e.g. voice and picture, possibly also a stream of pictures. One or more pictures are considered to encompass video.

Everybody on the contact list then have the possibility to check if the visitor is ok or if the visitor is someone who should not be there. In the latter case, an early opportunity to send someone to the place of the security arrangement is provided. In an advantageous embodiment of the present invention, a person on the contact list who has been notified by the security arrangement may by utilization of a predefined code, or dialing a telephone number, trigger the security arrangement to trigger an alarm on site, to e.g. scare away an intruder or prevent an ongoing crime. Further, a call may also be connected to SOS. The alarm may e.g. be sounded by a siren built-in in the security arrangement 1, by a siren wirelessly connected to the security arrangement 1 and positioned at a desire point in the place wherein the security arrangement 1 is mounted. The security arrangement 1 may further comprise a plurality of sirens, wirelessly connected, built-in or through wiring.

Further, by having the security arrangement 1 provided with one or more sirens, it may further advantageously be provided with a remote control device wherein the user can activate the alarm by e.g. pushing a button. The security arrangement 1 is then also preferably configured to take pictures with its camera device(s) and send pictures, video and/or sound to the contact list. In an alternative embodiment the remote control device is replace or supplemented by a voice control device of the security arrangement 1.

By the security arrangement comprising positioning means, such as GPS, everybody on the contact list may be updated of the position thereof. A position need only to be transmitted to the contact list when the security arrangement is not in a mounted position. Positioning information is preferably activated both at voluntary/authorized removal of the security arrangement as well as when being tampered with.

The security arrangement can preferably both transmit to and receive data from persons on the contact list. A person on the contact list may e.g. receive status updates and similar notification from the security arrangement to a television device, a computer, a mobile device such as smart phone, or other device possible to receive notifications. When a person on the contact list has a device comprising a camera device, visual communication through the security arrangement is possible.

A security arrangement according to the present invention will be available under the name Secureon™.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A security arrangement comprising:

a mobile unit operatively coupled to a door comprising:

a housing;

a sensor arrangement arranged in said housing; a camera device arranged in said housing;

a GPS arranged in said housing; and a communication unit arranged in said housing;

wherein said sensor arrangement includes a proximity detector to detect movement of said door being monitored by said security arrangement and said security arrangement is configured to in response to detection of movement of said door activate said camera device and take a picture;

wherein said security arrangement is configured to transmit from said security arrangement a GPS position together with a taken picture to a contact list utilizing said communication unit; and wherein said sensor arrangement includes a motion detector to monitor motion in an area and said security arrangement is configured to transmit from said security arrangement a notification to said contact list utilizing said communication unit when no motion in said area has been detected during a predetermined period of time;

wherein said security arrangement is attached to said door during use.

2. The security arrangement according to claim 1, wherein said sensor arrangement is configured to transmit a notification to said contact list utilizing said communication unit when no movement of said door has been detected during a predetermined period of time.

3. The security arrangement according to claim 1, wherein said sensor arrangement comprises a microphone for registering sound, and said security arrangement is configured to transmit registered sound to said contact list utilizing said communication unit.

4. The security arrangement according to claim 1, wherein said sensor arrangement comprises a tampering sensor for detecting removal of said security arrangement from said door it is attached to, and said security arrangement is configured to transmit a notification of tempering to said contact list utilizing said communication unit when indicated by said tampering sensor.

5. A method for a security arrangement, comprising the following steps:

providing the security arrangement comprising a mobile unit having a housing, a sensor arrangement arranged in said housing, a camera arranged in said housing, a GPS arranged in said housing, and a wireless communication unit arranged in said housing:

operatively coupling the security arrangement to a door:

detecting movement of said door being monitored by said security arrangement with a sensor;

taking a picture with the camera arranged in said housing;

establishing a position of the security arrangement with said GPS arranged in said housing;

transmitting using the wireless communication unit arranged in said housing the position together with a taken picture to a contact list remote from said security arrangement; and monitoring motion in an area with a motion sensor separate from the sensor detecting movement of the door at said security arrangement; and transmitting a notification to said contact list remote from said security arrangement when no motion in said area has been detected during a predetermined period of time;

wherein said security arrangement is attached to said door during use.

6. The method according to claim 5, comprising the steps of:

attaching said security arrangement to said door during use.

7. The security arrangement according to claim 5 wherein the sensor is a motion sensor.

8. A security arrangement comprising:

a wireless, mobile unit operatively coupled to a door comprising:

housing;

a sensor arrangement arranged in said housing;

a camera device arranged in said housing;

a positioning means arranged in said housing; and a communication unit arranged in said housing;

wherein said sensor arrangement comprises at least a vibration sensor configured to detect movement of said door being monitored by said security arrangement and said security arrangement is configured to in response to detection of movement of said door activate said camera device and take a picture and a motion detector configured to detect movement in an area about said security arrangement;

wherein said security arrangement transmits a security arrangement position together with said picture to a contact list using said communication unit and transmits a notification to the contact list using said communication unit when no motion in said area has been detected during a predetermined period of time;

wherein said security arrangement is attached to said door during use.

* * * * *